(12) United States Patent
Tsuge et al.

(10) Patent No.: US 7,714,093 B2
(45) Date of Patent: May 11, 2010

(54) URETHANE RESIN SOLUTION, PROCESS FOR ITS PRODUCTION AND PROCESS FOR PRODUCING URETHANE RESIN

(75) Inventors: Yukio Tsuge, Kamisu (JP); Tomeyoshi Ohori, Kamisu (JP); Hiroshi Wada, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 437 days.

(21) Appl. No.: 11/507,544

(22) Filed: Aug. 22, 2006

(65) Prior Publication Data

US 2006/0281891 A1    Dec. 14, 2006

Related U.S. Application Data

(63) Continuation of application No. PCT/JP2005/019145, filed on Oct. 18, 2005.

(30) Foreign Application Priority Data

| Oct. 20, 2004 | (JP) | ............................. 2004-305396 |
| Sep. 22, 2005 | (JP) | ............................. 2005-276872 |

(51) Int. Cl.
| C08G 18/40 | (2006.01) |
| C08G 18/10 | (2006.01) |
| C08G 18/42 | (2006.01) |
| C08G 18/48 | (2006.01) |
| C08G 63/08 | (2006.01) |
| C08G 63/68 | (2006.01) |

(52) U.S. Cl. ............................. 528/66; 528/61; 528/65; 528/76; 528/80; 528/354

(58) Field of Classification Search .................... 528/61, 528/65, 76, 80, 354, 357, 66
See application file for complete search history.

(56) References Cited

U.S. PATENT DOCUMENTS

| 5,032,671 A | 7/1991 | Harper |
| 5,340,902 A | 8/1994 | Smith et al. |
| 6,503,997 B1 | 1/2003 | Saito et al. |
| 2006/0122356 A1 | 6/2006 | Hamasaki et al. |
| 2007/0088146 A1 | 4/2007 | Nakamura et al. |

FOREIGN PATENT DOCUMENTS

| EP | 0 284 289 | | 9/1988 |
| EP | 0 343 985 | | 11/1989 |
| EP | 0 428 737 A1 | | 5/1991 |
| JP | 63-235320 | | 9/1988 |
| JP | 2-19511 | | 1/1990 |
| JP | 6-145284 | | 5/1994 |
| JP | 8-511297 | | 11/1996 |
| JP | 9-208653 | | 8/1997 |
| JP | 09-208653 | * | 8/1997 |
| JP | 2002-348727 | | 12/2002 |
| JP | 2002-348728 | | 12/2002 |
| JP | 2003-96293 | | 4/2003 |
| JP | 2004-027054 | * | 1/2004 |
| JP | 2004-27054 | | 1/2004 |
| JP | 2005-179567 | | 7/2005 |

OTHER PUBLICATIONS

U.S. Appl. No. 11/941,561, filed Nov. 16, 2007, Tsuge, et al.
U.S. Appl. No. 12/032,052, filed Feb. 15, 2008, Uemori, et al.
U.S. Appl. No. 11/737,252, filed Apr. 19,. 2007, Tsuge, et al.
U.S. Appl. No. 11/876,200, filed Oct. 22, 2007, Ohori, et al.

* cited by examiner

*Primary Examiner*—Vasu Jagannathan
*Assistant Examiner*—Benjamin J Gillespie
(74) *Attorney, Agent, or Firm*—Oblon, Spivak, McClelland, Maier & Neustadt, L.L.P.

(57) ABSTRACT

Provided are a urethane resin solution to provide a urethane resin having a low tensile elasticity, a low elastic modulus under low temperatures, good elastic recovery, excellent heat resistance and excellent adhesion, a production method of the solution and a production method of the urethane resin.

An isocyanate group-terminated prepolymer is synthesized by reacting a polyisocyanate compound with a polyetherester diol having a molecular weight of from 800 to 4,000, which is obtained by a ring-opening polymerization of a mixture of an alkylene oxide and a lactone monomer using a polyoxy tetramethylene diol having a molecular weight of from 500 to 2,500 as an initiator and using a composite metal cyanide complex catalyst if necessary, and the resulting prepolymer is reacted with a chain extender, for example, comprised of a low molecular weight diamine and/or a low molecular weight diol, in an organic solvent. The urethane resin solution obtained is molded into a predetermined shape, or a substrate is coated or impregnated with the urethane resin solution and thereafter the organic solvent is removed to obtain a urethane resin.

8 Claims, No Drawings

URETHANE RESIN SOLUTION, PROCESS FOR ITS PRODUCTION AND PROCESS FOR PRODUCING URETHANE RESIN

TECHNICAL FIELD

The present invention relates to a urethane resin solution, a process for its production and a process for producing a urethane resin.

BACKGROUND ART

A polyoxy tetramethylene diol (hereinafter also referred to as "PTMG") is a polymer of tetrahydrofuran (hereinafter referred to as "THF"). A urethane resin with this PTMG as a soft segment component is used for an elastic fiber, a synthetic leather, a flooring material, a printing ink binder, and so on because it is excellent in an elastic property, hydrolysis resistance, and so on.

However, PTMGs with a molecular weight ranging from 500 to 2,500, which are useful for the urethane resin, have a melting point in a range of from 20 to 40° C. Urethane resins using these PTMGs as a raw material have a problem that polyol-derived portions crystallize at temperatures below the ordinary temperature to enhance the elastic modulus (modulus) and degrade elastic recovery at low temperatures. This property might pose a problem in application to the elastic fiber. In a case where the elastic fiber is used for stockings or the like, for example, the high elastic modulus (modulus) will result in a too strong constriction and degradation of comfortableness in turn. Furthermore, in a case where this elastic fiber is used for sportswear, there is a problem that under low temperatures the stretchability becomes poor and wearability becomes poor. It becomes unsuitable for use, particularly in the winter season or under subzero temperatures like skiwear.

In order to improve the above drawbacks of PTMGs, it is proposed to use a copolymer of THF and 3-methyltetrahydrofuran (hereinafter referred to as "3Me-THF") or a random copolymer of THF and ethylene oxide (hereinafter also referred to as "EO") and/or propylene oxide (hereinafter referred to as "PO") (cf. Patent Documents 1 to 5). However, with respect to the THF/3Me-THF copolymer, the polyol becomes expensive because the raw material 3Me-THF is expensive, and its heat resistance at high temperatures is insufficient. Furthermore, the THF/PO random copolymer or THF/EO random copolymer is not satisfactory in the tensile property, and a molecular weight distribution of the polyol is likely to be wide. In addition, the urethane resins using these materials as raw materials were insufficient in the elastic property and tensile property.

There are thus strong demands for a method for inexpensively producing a urethane resin with satisfactory properties with respect to all the properties including the heat resistance, elastic property, tensile property, and so on.

Patent Document 1: JP-A-63-235320
Patent Document 2: JP-A-2-19511
Patent Document 3: JP-A-2002-348727
Patent Document 4: JP-A-2002-348728
Patent Document 5: JP-A-8-511297

DISCLOSURE OF THE INVENTION

Object to be Accomplished by the Invention

The present invention was made in order to overcome the problems in the prior art and provides a urethane resin solution for a urethane resin which has a large elongation at break, a low elastic modulus in tension or under low temperatures, excellent elastic recovery and excellent heat resistance, and a process for its production. The present invention further provides a process for producing a urethane resin, using the above urethane resin solution.

Means to Accomplish the Object

The inventors of the present invention have conducted intensive studies to accomplish the object and found that a urethane resin excellent in the elastic property, heat resistance, etc. can be obtained by using as a raw material, a diol obtained by a random copolymerization of a mixture of an alkylene oxide and a lactone monomer with a PTMG, thereby accomplishing the present invention. Namely, the present invention resides in the following gist.

(1) A process for producing a urethane resin solution, comprising reacting an isocyanate group-terminated prepolymer with a chain extender in an organic solvent, wherein the prepolymer is obtained by reacting a polyisocyanate compound with a polyetherester diol (P) having a molecular weight of from 800 to 4,000, which is obtained by a ring-opening polymerization of a mixture of an alkylene oxide and a lactone monomer using a polyoxy tetramethylene diol having a molecular weight of from 500 to 2,500 as an initiator.

(2) The process for producing a urethane resin solution according to above (1), wherein a composite metal cyanide complex catalyst is used as a catalyst for the ring-opening polymerization of the mixture of the alkylene oxide and the lactone monomer.

(3) The process for producing a urethane resin solution according to above (1) to (2), wherein the chain extender is a low molecular weight diamine and/or a low molecular weight diol.

(4) A urethane resin solution in which a urethane resin is dissolved in an organic solvent, wherein the urethane resin is obtained by reacting an isocyanate group-terminated prepolymer with a chain extender, wherein the prepolymer is obtained by reacting a polyisocyanate compound with a polyetherester diol (P) having a molecular weight of from 800 to 4,000, which is obtained by a ring-opening polymerization of a mixture of an alkylene oxide and a lactone monomer using a polyoxy tetramethylene diol having a molecular weight of from 500 to 2,500 as an initiator.

(5) The urethane resin solution according to above (4), wherein the urethane resin is obtained by reacting the isocyanate group-terminated prepolymer with the chain extender in the organic solvent.

(6) The urethane resin solution according to above (4) or (5), wherein the urethane resin is used for an elastic film, an elastic fiber or a synthetic leather.

(7) A process for producing a urethane resin, comprising molding the urethane resin solution as defined in above (4) or (5), into a predetermined shape, and thereafter removing the organic solvent.

(8) A process for producing a urethane resin, comprising coating or impregnating a substrate with the urethane resin solution as defined in above (4) or (5), and thereafter removing the organic solvent.

EFFECTS OF THE INVENTION

The urethane resin obtained by coating or molding with the use of the urethane resin solution produced in accordance with the production method of the present invention is excellent in the elastic property and heat resistance, has a low tensile elasticity and is drastically improved in the elastic recovery under low temperatures.

BEST MODE FOR CARRYING OUT THE INVENTION

Now, the present invention will be further explained with respect to raw materials including intermediates used in the present invention, the urethane resin solution of the present invention, the process for its production and the process for producing the urethane resin.

(Polyetherester Diol (P))

The polyetherester diol (P) of the present invention can be produced by a ring-opening polymerization of a mixture of an alkylene oxide and a lactone monomer using a PTMG as an initiator.

The molecular weight of the PTMG (initiator) is from 500 to 2,500, preferably from 500 to 2,000. If the molecular weight is less than 500, the elastic property of the resulting urethane resin tends to be insufficient. If the molecular weight exceeds 2,500, the elastic recovery of the urethane resin tends to be insufficient at low temperatures due to a crystallizing property of the initiator portion.

The PTMG can be obtained by a ring-opening polymerization of THF. The polymerization can employ a catalyst selected from the group consisting of zeolite, metalloaluminosilicate, a super strong acid such as fluorosulfonic acid, a mixture of an acid and acetic anhydride, a perfluorosulfonic acid resin, bleaching clay, or a heteropoly acid in which a content of crystallization water is controlled in a specific range. Furthermore, the PTMG may be a copolymer of THF and another monomer. Examples of the monomer used for producing the copolymer include alkane diols having a carbon number of from 2 to 10, alkylene oxides, oxetane, cyclic acetals and 2-methyltetrahydrofuran. The present invention can employ a commercially available PTMG.

In the present invention, the alkylene oxide to be polymerized with the lactone monomer in the presence of the initiator is preferably an alkylene oxide having a carbon number of from 2 to 4. Examples of the alkylene oxide include propylene oxide, 1,2-butylene oxide, 2,3-butylene oxide, ethylene oxide, and so on. One of the alkylene oxides may be used alone, or two or more of them may be used in combination. In the production method of the present invention, ethylene oxide, propylene oxide or a combination of them is preferred.

The lactone monomer used in the present invention is preferably one of those having a carbon number of from 3 to 9, and examples thereof include ε-caprolactone, δ-valerolactone, β-methyl-δ-valerolactone, and so on. ε-caprolactone is particularly preferred.

A catalyst can be used in the production of the polyetherester diol (P). Examples of the catalyst include diethyl zinc, iron chloride, metalloporphyrins, phosphazene, composite metal cyanide complexes, and so on. It is preferable to use one of the composite metal cyanide complexes as the catalyst because a polyetherester diol with a narrow molecular weight distribution can be produced.

The composite metal cyanide complex catalyst may be a known zinc-hexacyanocobaltate complex or the like. An ether and/or alcohol complex thereof is particularly preferred. Preferable examples of the ether include ethylene glycol dimethyl ether (glyme), diethylene glycol dimethyl ether (diglyme) and ethylene glycol mono-tert-butyl ether. In addition, preferable examples of the alcohol include tert-butyl alcohol, ethylene glycol mono-tert-butyl ether, tert-pentyl alcohol, and so on.

The ratio of the alkylene oxide and the lactone monomer to be used is preferably a molar ratio of alkylene oxide/lactone monomer of from 30/70 to 95/5, particularly preferably from 30/70 to 80/20. If the ratio of the alkylene oxide to the total of the alkylene oxide and the lactone monomer is less than 30 mol %, the resulting diol (P) is likely to crystallize, whereby the elastic recovery tends to be impaired under low temperatures in the urethane resin using the diol as the raw material. On the other hand, if the ratio of the alkylene oxide exceeds 95 mol %, the amount of the lactone component becomes small and the heat resistance of the resulting urethane resin tends to be poor, which is not preferable. The diol (P) having a random copolymer chain composed of the alkylene oxide and lactone monomer can be obtained by carrying out the reaction within the above ratio.

Various combinations can be applicable as monomers for the random copolymerization, and a particularly preferred combination is a binary system of ethylene oxide and ε-caprolactone, a binary system of propylene oxide and ε-caprolactone, or a ternary system of ethylene oxide, propylene oxide and ε-caprolactone. Furthermore, the mixture of the alkylene oxide and lactone monomer is subjected to the ring-opening polymerization while conditions such as a temperature, a pressure and a period are optionally set to preferred conditions.

The polyetherester diol (P), obtained by the random copolymerization of the mixture of the alkylene oxide and lactone monomer using the PTMG as the initiator, has a molecular weight of from 800 to 4,000. If the molecular weight of the diol (P) is less than 800, the resulting urethane resin tends to be too hard to achieve the large elongation at break and the low elastic modulus, which are the features of the present invention. On the other hand, if the molecular weight exceeds 4,000, the viscosity of the diol (P) becomes so high that it is difficult to synthesize a urethane resin. Furthermore, the physical properties such as the tensile strength become poor.

The ratio of the copolymer chain of the alkylene oxide and lactone monomer in the polyetherester diol (P) thus obtained is preferably from 20 to 80 mass %, more preferably from 20 to 60 mass %. If the ratio is less than 20 mass %, the heat resistance and the elastic recovery at low temperatures of the urethane resin produced with the polyol tend to degrade. If the ratio exceeds 80 mass %, the elastic recovery under low temperatures of the resulting urethane resin tends to degrade.

(Urethane Resin Solution)

The polyetherester diol (P) used for the production of the urethane resin solution of the present invention may be used in combination with another polyol. The other polyol is preferably one having a molecular weight of from 500 to 4,000, particularly preferably a diol. Examples of the diol include polyoxyethylene diol, polyoxypropylene diol, polyoxyethylenepropylene diol, PTMG, polyester diol composed of a low molecular weight diol and a low molecular weight dicarboxylic acid, polycaprolactone diol obtained by a ring-opening polymerization of caprolactone, polycarbonate diol, and so on. Furthermore, a low molecular weight diol having a molecular weight of less than 500 may be used in combination. Examples of the low molecular weight diol include ethylene glycol, propylene glycol, 1,3-propanediol, 1,4-butanediol, and so on. When the diol is used in combination, the content of the diol is preferably at most 20 mass %, more preferably substantially 0 mass % relative to the total of the polyols.

(Isocyanate Group-Terminated Prepolymer)

The isocyanate group-terminated prepolymer, which is one of the intermediate materials for the urethane resin solution of the present invention, can be produced by reacting the above diol (P) with a polyisocyanate compound. There are no particular restrictions on the polyisocyanate compound. Specific examples of the polyisocyanate compound include aromatic polyisocyanate compounds such as diphenyl methane diisocyanate, polyphenylene polymethylene polyisocyanate, 2,4-tolylene diisocyanate, 2,6-tolylene diisocyanate and naphthalene-1,5-diisocyanate; alkyl aryl polyisocyanate compounds such as xylylene diisocyanate and tetramethyl xylylene diisocyanate; aliphatic polyisocyanate compounds such as hexamethylene diisocyanate; alicyclic polyisocyanate compounds such as isophorone diisocyanate and 4,4'-methylene bis(cyclohexyl isocyanate); and urethane modified compounds, biuret modified compounds, allophanate modified compounds, carbodiimide modified compounds and isocyanurate modified compounds obtained from the above polyisocyanate compounds. The polyisocyanate compound to be used in the present invention is preferably one of the aromatic polyisocyanate compounds for the following reasons: the reactivity with the polyol compound is excellent; the viscosity of the resulting isocyanate group-terminated prepolymer is low; and so on. Among others, diphenyl methane diisocyanate is preferred. Hexamethylene diisocyanate and isophorone diisocyanate are particularly preferred for the use disliking yellowing with time. One of the above polyisocyanate compounds can be used alone or two or more kinds of hem can be used in combination.

It is preferable to produce the isocyanate group-terminated prepolymer of the present invention by reacting the diol (P) with the polyisocyanate compound in such a ratio that the isocyanate group/hydroxyl group (molar ratio) is from 1.5 to 4. The isocyanate group-terminated prepolymer can be produced by one of known methods. For example, the diol (P) and the polyisocyanate compound are reacted as heated at a temperature of from 60 to 100° C. under a dry nitrogen gas stream for 1 to 20 hours. This reaction may be carried out in an organic solvent.

The chain extender to be reacted with the above-mentioned isocyanate group-terminated prepolymer is preferably an active hydrogen-containing compound that reacts with an isocyanate group, i.e., a low molecular weight diamine or a low molecular weight diol. The low molecular weight diamine and low molecular weight diol preferably have a molecular weight of less than 500. Examples of the low molecular weight diamine include aliphatic diamines such as ethylenediamine, propylenediamine and hexamethylenediamine, an alicyclic diamine such as isophoronediamine, an alkyl aromatic diamine such as xylylenediamine, and hydrazine. Examples of the low molecular weight diol include ethylene glycol, propylene glycol, 1,3-propanediol and 1,4-butanediol. One of these compounds may be used alone or two or more kinds of them may be used in combination. It is preferable to use the low molecular weight diamine as the chain extender because the reactivity with the isocyanate group is high and because cohesion of the urethane resin is strong. Among others, the aliphatic diamines are preferred and the aliphatic diamines such as ethylenediamine and propylenediamine, and hydrazine are particularly preferred.

The reaction of the above prepolymer with the chain extender is preferably carried out as follows: the prepolymer is reacted with a desired chain extender so that the isocyanate index ((a number of the isocyanate group)/(a total number of the hydroxyl group and amino group in the chain extender)× 100) is preferably from 70 to 120, more preferably from 80 to 105, and especially preferably from 95 to 105. If the amount of the chain extender is outside the above range, the molecular weight of the resulting resin is too small to obtain a resin with high strength, which is not preferable.

Furthermore, in order to control the molecular weight and the viscosity, an active amino group-containing compound may be used as an end terminator in combination. When the low molecular weight diamine is used as the chain extender, the end terminator to be used may be a compound having one active amino group. Specific examples of the compound include diethylamine, dibutylamine, diethanolamine, and so on. The compound having an active amino group and a hydroxyl group like diethanolamine is substantially equivalent to a monofunctional compound because the reactivity of the hydroxyl group is lower than that of the amino group. Furthermore, when the low molecular weight diol is used as the chain extender, the end terminator to be used can be a compound having one active hydrogen group. For example, the compound may be diethylamine, dibutylamine, or the like.

The reaction temperature of the isocyanate group-terminated prepolymer with the chain extender is preferably from 0 to 120° C., particularly preferably from 10 to 100° C. When the reaction temperature is set at least 0° C., the prepolymer is prevented from being solidified. When the reaction temperature is set at most 120° C., it is feasible to avoid such problems that the raw materials are cured before sufficiently uniformly mixed.

Furthermore, the reaction of the isocyanate group-terminated prepolymer with the chain extender can be carried out in an organic solvent. By producing the isocyanate group-terminated prepolymer in a solvent, a solution containing a urethane resin can also be obtained by adding the chain extender into the solution. In particular, when the low molecular weight diamine is used as the chain extender, the reaction rate can be controlled by conducting the chain-extending reaction in the organic solvent, thereby obtaining a uniform reaction product. A resin solution can be obtained more easily by the reaction in the solvent than by the reaction without any solvent, because the resulting urethane resin has a relatively high viscosity. When the resin solution is produced by a method of obtaining a urethane resin by the reaction without any solvent and thereafter diluting it with an organic solvent, the dilution is likely to be difficult.

(Catalyst for Urethanization Reaction)

One of known catalysts for the urethanization reaction may be used for the reaction of the diol (P) with the polyisocyanate compound, and for the reaction of the isocyanate group-terminated prepolymer with the chain extender. Specific examples of the catalyst for the urethanization reaction include organotin compounds such as dibutyltin dilaurate, dioctyltin dilaurate, dibutyltin dioctoate and tin 2-ethylhexanoate; iron compounds such as iron acetylacetonate and ferric chloride; and tertiary amine catalysts such as triethylamine and triethylene diamine. Among others, the organotin compound is preferred.

In a case where the above-mentioned catalyst for the urethanization reaction is used, an amount of the catalyst to be used is preferably from 0.0001 to 1.0 part by mass, particularly preferably from 0.001 to 0.01 part by mass relative to the total of 100 parts by mass of the isocyanate group-terminated prepolymer and the chain extender.

Examples of the organic solvent to be used include dimethylacetamide, dimethylformamide, dimethylsulfoxide, methyl ethyl ketone, cyclohexanone, ethyl acetate, isopropyl alcohol, and the like. Among others, dimethylacetamide and dimethylformamide are preferred in terms of reaction and workability because they have good solubility in the urethane resin and achieve low viscosity.

(Production of Urethane Resin Solution)

The production process of the urethane resin solution of the present invention will be explained below. Specifically, the polyetherester diol (P) having a molecular weight of from 800 to 4,000 is reacted with the polyisocyanate compound to obtain the isocyanate group-terminated polyurethane prepolymer. This reaction may be carried out in an organic solvent. In a case where the reaction is carried out in an organic solvent, the prepolymer is used as it is; otherwise, the resulting prepolymer is dissolved in the above-mentioned organic solvent. Thereafter, the above-mentioned chain extender is added into the prepolymer solution and the chain-extending reaction is conducted to produce the urethane resin solution. The urethane resin solution may be diluted as the occasion demands. The resin concentration of the resin solution finally obtained is preferably from 15 to 40 mass %.

The urethane resin solution of the present invention may optionally contain an additive such as a pigment, a dye, an antiaging agent (an antioxidant or an ultraviolet absorber) or an anti-yellowing agent.

Examples of the antiaging agent such as an antioxidant or an ultraviolet absorber include a hindered phenol type compound such as butylhydroxytoluene (BHT), benzotriazole type and hindered amine type compounds, butylhydroxyanisole (BHA), diphenylamine, phenylenediamine and triphenyl phosphite. The pigment can be an inorganic pigment or an organic pigment. The inorganic pigment to be used may be titanium dioxide, zinc oxide, ultramarine blue, bengala, lithopone, iron, cobalt, aluminum, hydrochloride, sulfate, or the like. The organic pigment may be an azo pigment, a copper phthalocyanine pigment, or the like.

(Production Method of Urethane Resin)

The urethane resin of the present invention is produced by molding the above-mentioned urethane resin solution of the present invention into a predetermined shape and thereafter removing the organic solvent.

In addition to the above method, the urethane resin of the present invention can be produced by coating or impregnating a substrate with the above-mentioned urethane resin solution, and thereafter removing the organic solvent.

The urethane resin solution of the present invention can be molded into a film form by uniformly applying the solution onto a base material, drying it, and removing a film from the base material. Furthermore, an antioxidant, an anti-yellowing agent, a colorant, and others are added into the resin solution if necessary, and then the urethane resin solution is conditioned through defoaming and filtering. The conditioned solution is extruded from a nozzle into a spinning cylinder and a heated gas is introduced into the spinning cylinder to evaporate the solvent, thereby producing fiber. Furthermore, a surface of a fiber material or unwoven fabric is coated or impregnated with the urethane resin solution of the present invention and is made to pass through a water tank by the wet solidification method or through a heating oven by the dry solidification method to obtain a synthetic leather.

The urethane resin solution of the present invention can be also used as a printing ink binder or as a binder for magnetic recording media. In a case where the solution is used as the printing ink binder, a colorant, other additives, an additional organic solvent, and so on are mixed and dispersed in the urethane resin solution, thereby producing a printing ink composition. The printing ink composition obtained is applied to a substrate to be printed, by a gravure coat method, a roll coat method, a die coat method, a curtain coat method, a spin coat method or the like, and if necessary, it is subjected to heating or drying under a reduced pressure to obtain a coating. Examples of the substrate to be printed include plastic films of polyethylene terephthalate, nylon, polyolefins such as polyethylene and polypropylene, polystyrene, vinyl chloride, acrylic resin, cellophane, and so on, metal films such as aluminum foil, rubber, elastomer, and so on.

Furthermore, the binder for magnetic recording media can be produced by mixing and dispersing magnetic powder, other additives and an additional organic solvent in the urethane resin solution. The resulting binder for magnetic recording media is applied onto a substrate such as a PET film and dried, thereby producing magnetic recording media such as a flexible disk or a magnetic tape of coating type.

Moreover, a polyurethane elastomer can be produced from the urethane resin solution of the present invention by mixing a reaction mixture of the solution containing optionally selected materials, e.g., additives such as a filler, a reinforcing material, a flame retardant, and a mold-releasing agent, and a foaming agent, and then pouring the mixture into a die of a desired shape, extruding it, or adhering it onto a moving belt, followed by curing. In addition, a variety of products can be produced using as a starting material the above polyurethane elastomer after pulverized or pelletized, by methods of injection molding, blow molding, or the like with an extruder or with other apparatus.

EXAMPLES

Now, the present invention will be explained more specifically with reference to Examples and Comparative Examples, but it is noted that the present invention is by no means limited to the specific examples.

Table 1 shows the initiators used in Examples and Comparative Examples of the present invention and their properties. It is noted that in the tables below AO represents alkylene oxide, EO ethylene oxide, PO propylene oxide, CL ε-caprolactone monomer, PTMG polyoxy tetramethylene diol, and PCL polycaprolactone diol.

Viscosities (unit: mPa·s) of the polyols and prepolymers were measured at 25° C. by the method described in JIS K1557 (1970). A molecular weight $M_{OH}$ of each polyol is a converted value calculated by the formula below with the number of hydroxyl groups in the polyol and a hydroxyl value measured in accordance with the method described in JIS K1557 (1970). The number of hydroxyl groups in the polyether polyol was the number of functional groups of the initiator used for the production thereof.

$$M_{OH} = (56,100 \times \text{number of hydroxyl groups in polyol})/\text{hydroxyl value}$$

TABLE 1

| Name | Details | Molecular weight $M_{OH}$ | Viscosity mPa·s/25° C. | Number of functional group | Note |
|---|---|---|---|---|---|
| PTG-1000 | PTMG manufactured by HODOGAYA CHEMICAL CO., LTD. | 1,000 | Solid | 2 | |
| PTG-2000 | PTMG manufactured by HODOGAYA CHEMICAL CO., LTD. | 2,000 | Solid | 2 | R-1 |
| PTMG-1500 | PTMG manufactured by Mitsubishi Chemical Corporation | 1,500 | Solid | 2 | |
| PCL-220 | PCL manufactured by DAICEL CHEMICAL INDUSTRIES, LTD. | 2,000 | Solid | 2 | R-2 |
| PTG-L2000 | Copolymer of THF and 3Me-THF manufactured by HODOGAYA CHEMICAL CO., LTD. | 2,000 | 2,380 | 2 | R-3 |
| PPTG-2000 | Coplymer of THF and PO manufactured by HODOGAYA CHEMICAL CO., LTD. | 2,000 | 840 | 2 | R-4 |
| PTMG-1800 | PTMG manufactured by Mitsubishi Chemical Corporation | 1,800 | Solid | 2 | |
| PTMG-2000 | PTMG manufactured by Mitsubishi Chemical Corporation | 2,000 | Solid | 2 | |

[Synthesis of Polyetherester Diol]

(Synthesis of Diol [P-1])

1,000 g of a PTMG (PTG-1000 manufactured by HODOGAYA CHEMICAL CO., LTD., $M_{OH}$=1,000) as an initiator and 50 mg of zinc hexacyanocobaltate-tert-butyl alcohol complex were introduced into a pressure-proof reactor equipped with a stirrer and a nitrogen-introducing tube. After replacing the interior of the reactor with nitrogen, the temperature was raised by heating to 120° C., and 200 g of ethylene oxide and 800 g of caprolactone monomer were simultaneously and quantitatively supplied over about five hours. After completion of the supply, the mixture was further reacted at 120° C. for one hour, thereby obtaining a polyetherester diol (the polyetherester diol thus obtained is called diol [P-1]). The hydroxyl value of the diol [P-1] obtained was 56. Since the initiator (PTMG) is a diol and the hydroxyl value thereof is 56, the molecular weight of the diol [P-1] is 2,000. Table 2 shows the composition and properties of the diol [P-1] obtained.

(Syntheses of Diols [P-2] to [P-6] and [R-6])

Diols [P-2] to [P-6] and diol [R-6] were prepared in the same manner as the above diol [P-1], except that the raw materials were used with the initiator, the alkylene oxide type, and the quantitative ratio of the alkylene oxide and caprolactone monomer as presented in Table 2. It is noted that [R-6] was prepared as a block-polymerized chain by first polymerizing the caprolactone monomer and then polymerizing EO. Table 2 shows the compositions and properties of the diols [P-2] to [P-6] and [R-6].

TABLE 2

| | Diol compound | | | | | | |
|---|---|---|---|---|---|---|---|
| | P-1 | P-2 | P-3 | P-4 | P-5 | P-6 | R-6 |
| Kind of initiator | PTG-1000 | PTG-1000 | PTG-1000 | PTMG-1500 | PTG-1000 | PTMG-1800 | PTG-1000 |
| Molecular weight $M_{OH}$ of initiator | 1,000 | 1,000 | 1,000 | 1,500 | 1,000 | 1,800 | 1,000 |
| Hydroxyl value of initiator (mgKOH/g) | 112 | 112 | 112 | 75 | 112 | 62 | 112 |
| AO used | EO | EO | EO | EO | PO | EO | EO (block) |
| Mass ratio of AO/CL added | 2/8 | 5/5 | 8/2 | 5/5 | 5/5 | 5/5 | 2/8 |
| Molar ratio of AO/CL added | 39/61 | 74/26 | 91/9 | 74/26 | 66/34 | 66/34 | 39/61 |
| Molecular weight $M_{OH}$ of diol obtained | 2,000 | 2,000 | 2,000 | 2,000 | 2,000 | 3,000 | 2,000 |
| Hydroxyl value of diol obtained (mgKOH/g) | 56 | 56 | 56 | 56 | 56 | 37 | 56 |
| Viscosity of diol obtained (mPa·s/25° C.) | Solid | Solid | Solid | Solid | Solid | Solid | 1,354 |

[Commercially Available Diols Used in Comparative Examples]

Commercially available diols [R-1] to [R-5] below were used as Comparative Examples. Table 3 shows the compositions and properties of the diols [R-1] to [R-5] used.

TABLE 3

| Diol compound | Kind of diol | | Molecular weight $M_{OH}$ | Hydroxyl value | Viscosity mPa·s/25° C. |
|---|---|---|---|---|---|
| R-1 | PTG-2000 | PTMG | 2,000 | 56 | Solid |
| R-2 | PCL-220 | PCL | 2,000 | 56 | Solid |
| R-3 | PTG-L2000 | Random copolymer of (THF)/(3Me-THF) | 2,000 | 56 | 2,380 |
| R-4 | PPTG-2000 | Random copolymer of (THF)/(PO) | 2,000 | 56 | 840 |
| R-5 | | Polyoxypropylene diol | 2,000 | 56 | 350 |

[Syntheses of Urethane Resin Solutions]

Examples 1 to 6

A predetermined polyetherester diol and diphenyl methane diisocyanate (MDI) were introduced at a ratio of isocyanate group/hydroxyl group (molar ratio) of 1.75 into a rector equipped with a stirrer and a nitrogen-introducing tube, and reacted at 80° C. under a nitrogen atmosphere for about 4 hours to obtain an isocyanate group-terminated polyurethane prepolymer. Table 4 shows a content of the isocyanate group (NCO content in the table) in the prepolymer. The prepolymer was dissolved in dimethylacetamide to obtain a prepolymer solution. Thereafter, a mixture of ethylenediamine as a chain extender and diethylamine (a mixture at such a ratio that a ratio of their amino groups was 95/5 (molar ratio)) was added into this prepolymer solution so that (the isocyanate group contained in the prepolymer)/(the total number of the amino groups) (molar ratio) was 1.01. Then a polymerization reaction was made to take place and dimethylacetamide was then added to obtain a urethane resin solution having a resin concentration of about 30 mass %. Table 4 shows kinds of the diols used and viscosities of the urethane resin solutions obtained.

Comparative Examples 1 to 7

Urethane resin solutions of Comparative Examples 1 to 7 were obtained in the same manner as in Example 1 except that diols shown in Table 5 were used instead of the diol [P-1]. Tables 5 to 6 show viscosities of the urethane resin solutions obtained.

(Production of Urethane Films)

Each urethane resin solution obtained was applied onto a biaxially stretched polypropylene film with an applicator having an opening of 500 μm. The film coated was maintained at 80° C. in a drier for 30 minutes, and further maintained at 80° C. in a vacuum drier for 60 minutes to completely remove the solvent of dimethylacetamide, thereby obtaining a urethane resin film.

Each urethane resin film obtained was cured at 20° C. under a relative humidity of 60% for one day, and then cut with a dumbbell cutter to obtain each test piece of a predetermined shape.

(Evaluation of Urethane Resin Films)

Each urethane resin film (film) was tested as to each of items below.

(1) Initial Properties (Tensile Test)

Each film was subjected to a tensile test under the conditions below to measure the 100% modulus ($M_{100}$), 300% modulus ($M_{300}$), strength at break and elongation at break in accordance with JIS K7311 (1995).

Measuring apparatus: tensile tester (Tensilon U™ manufactured by Toyo-Baldwin Company), Test piece: dumbbell test piece-3, Tensile rate: 300 mm/min, Measuring temperature: 23° C., relative humidity of 65%.

(Elastic Recovery Rate)

A test piece in a gauge length of 20 mm (L1) was subjected to five times of 300% elongation at a tensile rate of 500 mm/min at 20° C. under a relative humidity of 65%, and then a length (L2) of the test piece at the stress of 0 was measured. The elastic recovery rate was calculated in accordance with the following equation.

Elastic recovery rate:100−(L2−L1)/L1×100

(2) Heat Resistance Test

Each film was maintained at 180° C. for 5 minutes, and then at room temperature for at least 12 hours, and thereafter the film was subjected to the tensile test in the same manner as above. Furthermore, a strength retention rate was calculated according to (strength at break after heat resistance test)/(strength at break before heat resistance test)×100.

(3) Properties Under Low Temperatures (Elastic Modulus Under Low Temperatures)

The elastic modulus under low temperatures was measured by an apparatus below. A value of storage elastic modulus (E') at −15° C. was read from a graph.

Apparatus: dynamic viscoelasticity measuring apparatus (DMS6100 manufactured by SII NanoTechnology Inc.)

Size of test piece: 10 mm×30 mm (thickness: about 150 μm)

Test temperatures: −100° C. to 100° C.

(Elastic Recovery Rate Under Low Temperatures)

The elastic recovery rate was measured at −15° C. in the same manner as above.

TABLE 4

| | Example 1 | Example 2 | Example 3 | Example 4 | Example 5 | Example 6 |
|---|---|---|---|---|---|---|
| Diol | P-1 | P-2 | P-3 | P-4 | P-5 | P-6 |
| NCO content (mass %) | 2.52 | 2.64 | 2.62 | 2.63 | 2.61 | 1.77 |
| Viscosity of polyurethane resin solution (Pa·s/25° C.) | 600 | 540 | 140 | 370 | 440 | 300 |
| Initial properties | | | | | | |
| M100 (MPa) | 4.3 | 4.1 | 3.1 | 4.5 | 3.8 | 2.2 |
| M300 (MPa) | 7.0 | 6.8 | 5.0 | 7.5 | 6.2 | 4.5 |
| Strength at break (MPa) | 39 | 37 | 32 | 40 | 35 | 43 |
| Elongation at break (%) | 770 | 790 | 1,020 | 750 | 880 | 810 |
| Elastic recovery rate (%) | 74 | 65 | 61 | 65 | 69 | 86 |
| Heat resistance (secondary properties) | | | | | | |
| M100 (MPa) | 4.1 | 3.4 | 3.4 | 4.0 | 3.4 | 2.0 |
| Strength at break (MPa) | 31 | 45 | 37 | 36 | 30 | 41 |
| Strength retention rate (%) | 80 | 120 | 120 | 90 | 85 | 95 |
| Elongation at break (%) | 590 | 670 | 720 | 660 | 750 | 750 |
| Properties under low temperatures (−15° C.) | | | | | | |
| Elastic recovery under low temperatures (%) | 90 | 85 | 80 | 50 | 80 | 85 |
| Elastic modulus under low temperatures (MPa) | 10 | 9 | 6 | 20 | 8 | 9 |

TABLE 5

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Diol | R-1 | R-2 | R-3 | R-4 | R-5 | R-6 | Mixture of (R-1) and (R-2) at 50/50 mass ratio |
| NCO content (%) | 2.55 | 2.51 | 2.54 | 2.45 | 2.50 | 2.12 | 2.53 |
| Viscosity of polyurethane resin solution (Pa·s/25° C.) | 850 | 270 | 800 | 10 | 67 | 5 | 920 |
| Kind | PTMG | PCL | Random copolymer of (THF)/(Me-THF) | Random copolymer of (THF)/(PO) | Polyoxypropylene diol | | |
| Initial properties | | | | | | | |
| M100 (MPa) | 4.6 | 3.9 | 4.5 | 4.6 | 3.1 | 2.7 | 4.6 |
| M300 (MPa) | 10 | 15 | 8.8 | 6.4 | 5.1 | 4.4 | 9.1 |
| Strength at break (MPa) | 46 | 40 | 53 | 18 | 13 | 11 | 45 |
| Elongation at break (%) | 630 | 600 | 720 | 1,050 | 1,040 | 1,210 | 670 |
| Elastic recovery rate (%) | 80 | 0 | 81 | 65 | 50 | 65 | 70 |
| Heat resistance (secondary properties) | | | | | | | |
| M100 (MPa) | 5.1 | 4.0 | 2.2 | 3.7 | 2.1 | 2.2 | 4.5 |
| Strength at break (MPa) | 32 | 60 | 24 | 14 | 2.5 | 9 | 47 |
| Strength retention rate (%) | 70 | 140 | 46 | 76 | 20 | 80 | 100 |
| Elongation at break (%) | 510 | 620 | 600 | 1,000 | 170 | 930 | 570 |
| Properties under low temperatures (−15° C.) | | | | | | | |
| Elastic recovery under low temperatures (%) | 0 | 0 | 85 | 75 | 90 | 40 | 0 |
| Elastic modulus under low temperatures (MPa) | 70 | 200 | 10 | 20 | 7 | 3 | 100 |
| Evaluations | Poor in properties under low temperatures | Poor in properties under low temperatures | Poor in heat resistance | Poor in strength | Poor in both strength and heat resistance | Poor in strength | Poor in properties under low temperatures |

Table 4 shows the properties of the films in Examples 1 to 6, Table 5 shows the properties of the films in Comparative Examples 1 to 7, and Table 6 shows the properties of the films in Example 7 and Comparative Example 8.

It is clear from the results shown in Tables 4 and 5 that the urethane resin films of Examples 1 to 6 have the high low-temperature elastic recovery rates at −15° C. in a range of from 50 to 90%, the poor low-temperature elastic modulus values in a range of from 6 to 20 MPa, and the room-temperature elongation at break values of at least 750%. Furthermore, they also demonstrate the strength retention rates of at least 80% in the tensile test after retained at 180° C. for 5 minutes, and are excellent in the heat resistance.

On the other hand, the urethane resins in Comparative Examples 1, 2 and 7 have the poor low-temperature elastic recovery rates, and those in Comparative Examples 3 to 6 have the good low-temperature elastic properties but the poor heat resistances and tensile strengths.

It is clear from the above results that the urethane resins made from the urethane resin solutions of the present invention as the raw material show a high elongation at break in the form of elastic fiber or the like and excellent elastic recovery rates under low temperatures, and are suitable for applications requiring some heat resistance.

[Production of Urethane Resin for Printing Ink]

Example 7

A urethane resin was produced as follows. 400 g of polyether diol (P-1), 66.7 g of isophorone diisocyanate (at a ratio of isocyanate group/hydroxyl group (molar ratio) of 1.5) and 0.05 g of dibutyltin dilaurate as a catalyst were mixed in a reactor equipped with a stirrer and a nitrogen-introducing tube and heated at 80° C. to react for 4 hours, thereby preparing an isocyanate group-terminated prepolymer (in which the isocyanate group content was 1.8 mass %).

The prepolymer obtained was dissolved in 700 g of methyl ethyl ketone. Then a chain extender solution was so prepared that 17 g of isophorone diamine and 0.7 g of dibutylamine were dissolved in 300 g of isopropyl alcohol and 148 g of methyl ethyl ketone (the ratio of amino groups of isophorone diamine and dibutylamine (molar ratio) was 95/5). This solution prepared was added into the prepolymer solution and reacted at 80° C. to obtain a polyurethane urea solution with a resin content of 30 mass % (the ratio of isocyanate group/a total number of amino groups (molar ratio) was 1/1.05).

Comparative Example 8

A polyurethane urea solution was prepared in the same manner as in Example 7 except that PTMG-2000 was used instead of the polyether diol (P-1).

(Preparation of White Ink Composition)

A printing ink was prepared using each resulting polyurethane urea solution as a binder, as follows. Namely, the raw materials below were introduced into a steel can having an inner volume of 500 cm³ and kneaded for one hour by a paint conditioner to obtain a white ink composition for printing. The resulting white ink composition was subjected to performance tests below.

| | |
|---|---|
| Urethane resin solution | 100 parts by mass |
| Pigment (rutile type titanium oxide) | 90 parts by mass |
| Isopropyl alcohol | 30 parts by mass |

-continued

| | |
|---|---|
| Methyl ethyl ketone | 40 parts by mass |
| Zircon beads (dispersion medium) | 150 parts by mass |

(Re-Dissolution)

The white ink composition was applied onto a glass plate with a bar coater so that a solid content had a thickness of 2 to 3 μm. The resultant was left at room temperature for 10 seconds to semi-dry the ink surface. Then the glass plate was immersed in a solvent (a solvent mixture of methyl ethyl ketone/ethyl acetate/isopropyl alcohol) to observe the re-dissolution of the ink film. Evaluation criteria were ○ for a case where the coating film was re-dissolved, and x for a case where the coating film was not re-dissolved but remained on the glass plate.

(Peeling Test of Cellophane Tape)

The white ink composition was applied onto each of surface-treated polypropylene (OPP), surface-treated polyester film (PET) and surface-treated nylon with a bar coater so that the solid content had a thickness of 2 to 3 μm. After drying at 60° C. for one minute, a cellophane tape (manufactured by NICHIBAN CO., LTD. and having the width of 12 mm) was put on the coating surface and one end of the cellophane tape was stripped rapidly in the perpendicular direction to the coating surface. Thereafter, a state of the coating surface was observed. Evaluation criteria were ○ for a case where the ink remained at least 80% of, Δ for a case where the ink remained from 50 to 80% of, and x for a case where the ink remained 50% or less.

Table 6 shows the results of the properties of each film.

TABLE 6

| | Example | |
|---|---|---|
| | Example 7 | Comparative Example 8 |
| Viscosity of polyurethane urea resin solution (mPa · s/25° C.) | 950 | 1,200 |
| Re-dissolution | ○ | X |
| Peeling test of cellophane tape | | |
| OPP | ○ | X |
| PET | ○ | Δ |
| Nylon | ○ | Δ |

It is clear from Table 6 that the printing ink composition of the polyurethane urea resin type made from the polyether polyol of the present invention is excellent in the re-dissolution and adhesiveness, as compared with the composition made from the general-purpose PTMG.

INDUSTRIAL APPLICABILITY

The urethane resin made from the urethane resin solution obtained by the production method of the present invention, and through application or through molding, is excellent in the elastic property and heat resistance, and has the low tensile modulus, the low elastic modulus, and the drastically improved elastic recovery under low temperatures. The urethane resin obtained in accordance with the present invention can be used for an elastic fiber, a synthesis leather, a flooring material, a printing ink binder, and so on. The urethane resin of the present invention is particularly suitable for use as elastic fiber in view of the properties thereof. When the elastic fiber is used for stockings, the elastic modulus (modulus) is low enough to achieve a not so strong constriction and offer comfortable wearability. Furthermore, when the elastic fiber is used for sportswear, it provides good stretchability and comfortable wearability even under low temperatures. In particular, the elastic fiber is suitable for applications in winter and under subzero temperatures like skiwear.

The entire disclosures of Japanese Patent Application No. 2004-305396 filed on Oct. 20, 2004 and Japanese Patent Application No. 2005-276872 filed on Sep. 22, 2005 including specifications, claims and summaries are incorporated herein by reference in their entireties.

What is claimed is:

1. A process for producing a urethane resin solution, comprising reacting an isocyanate group-terminated prepolymer with a chain extender in an organic solvent, wherein the prepolymer is obtained by reacting a polyisocyanate compound with a polyetherester diol (P) having a molecular weight of from 800 to 4,000, which is obtained by a ring-opening polymerization of a mixture of an alkylene oxide and a caprolactone monomer using a polyoxy tetramethylene diol having a molecular weight of from 500 to 2,500 as an initiator.

2. The process for producing a urethane resin solution according to claim 1, wherein a composite metal cyanide complex catalyst is used as a catalyst for the ring-opening polymerization of the mixture of the alkylene oxide and the caprolactone monomer.

3. The process for producing a urethane resin solution according to claim 1, wherein the chain extender is a low molecular weight diamine and/or a low molecular weight diol.

4. A urethane resin solution in which a urethane resin is dissolved in an organic solvent, wherein the urethane resin is obtained by reacting an isocyanate group-terminated prepolymer with a chain extender, wherein the prepolymer is obtained by reacting a polyisocyanate compound with a polyetherester diol (P) having a molecular weight of from 800 to 4,000, which is obtained by a ring-opening polymerization of a mixture of an alkylene oxide and a caprolactone monomer using a polyoxy tetramethylene diol having a molecular weight of from 500 to 2,500 as an initiator.

5. The urethane resin solution according to claim 4, wherein the urethane resin is obtained by reacting the isocyanate group-terminated prepolymer with the chain extender in an organic solvent.

6. The urethane resin solution according to claim 4, wherein the urethane resin is used for an elastic film, an elastic fiber or a synthetic leather.

7. A process for producing a urethane resin, comprising molding the urethane resin solution as defined in claim 4, into a predetermined shape, and thereafter removing the organic solvent.

8. A process for producing a urethane resin, comprising coating or impregnating a substrate with the urethane resin solution as defined in claim 4, and thereafter removing the organic solvent.

* * * * *